United States Patent [19]

Nohda

[11] 3,960,450
[45] June 1, 1976

[54] LENS METER WITH TARGET ORTHOGONALIZER

[75] Inventor: Masao Nohda, Kawasaki, Japan

[73] Assignee: Nippon Kogaku K.Y., Tokyo, Japan

[22] Filed: June 24, 1975

[21] Appl. No.: 589,751

[30] Foreign Application Priority Data
June 28, 1974  Japan.............................. 49-73971

[52] U.S. Cl.................................. 356/126; 351/13
[51] Int. Cl.$^2$...................... G01B 9/00; A61B 3/10
[58] Field of Search ........... 356/124, 125, 126, 127; 351/13, 30; 350/173

[56] References Cited
UNITED STATES PATENTS

| | | | |
|---|---|---|---|
| 3,389,632 | 6/1968 | Plummer............................. | 350/173 |
| 3,558,207 | 1/1971 | Worthington....................... | 350/173 |

Primary Examiner—John K. Corbin
Assistant Examiner—Conrad Clark
Attorney, Agent, or Firm—Shapiro and Shapiro

[57] ABSTRACT

A lens meter for measuring the focal length of a sample lens with the sample lens disposed in a collimated light beam comprises a target, a first lens for forming an image of the target, light beam splitter means in the light beam on the image forming side of the first lens for splitting the light beam to form a second target image, a second lens having its focal points on the first and second target images through the light beam splitter means, target orthogonalizing means provided between the first and second lenses for making the first and second target images orthogonal to each other, a third lens for focusing the orthogonal target images collimated by the second lens, and target viewing means disposed at the focal point of the third lens.

5 Claims, 6 Drawing Figures

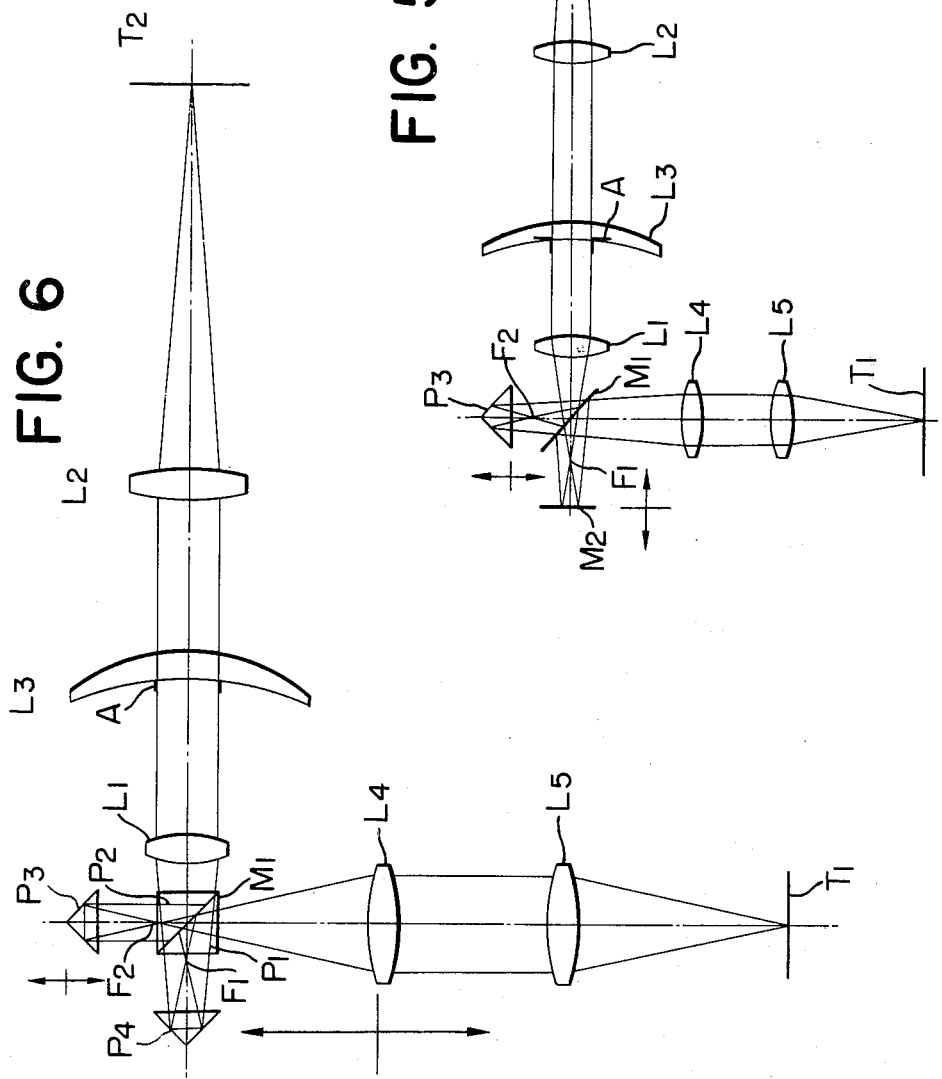

LENS METER WITH TARGET ORTHOGONALIZER

BACKGROUND OF THE INVENTION

This invention relates to a lens meter for measuring the focal length of a sample lens with the sample lens disposed in a collimated light beam.

DESCRIPTION OF THE PRIOR ART

The principle of a prior art lens meter currently being used is illustrated in FIG. 1 of the accompanying drawings. T1 designates a target which may be moved in the directions of the arrows. L1 is a lens for collimating a light beam having its focal point on the target T1, and L2 is an image forming lens for focusing the collimated image of the target T1 on a reticle T2. An aperture stop A is provided on the secondary focal point of the lens L1, and L3 is a sample lens, the diopter of which is measured on the aperture stop A. In an optical system having such an arrangement, the target T1 is moved in the plane of the optical axis and, if the image of the target is formed on the reticle T2 when the target has come onto the primary focal point of the lens L1 (such position is assumed as zero point), then the diopter of the sample lens L3 is zero.

The relation in which the target T1 and the reticle T2 are conjugate with each other may be expressed by the following equation:

$$Z = f^2 \times D,$$

where $Z$ is the amount of movement of the target T1 from the zero point, $f$ the focal length of the lens L1, and $D$ the refractive power of the sample lens.

The arrangement described above represents the known or ordinary lens meter. Usually, the focal lengths of two types of spectacle lenses require measurement — a spherical lens and an astigmatic lens. The spherical lens has a single refractive power, while the astigmatic lens has two refractive powers orthogonal to each other. Thus, for the spherical lens, the target T1 need undergo focusing only once, whereas for the astigmatic lens, the target T1 must undergo focusing twice to include the direction of the astigmatic axis. In a prescription for an astigmatic lens, one of the refractive powers is represented in the form of a spherical lens, and the other refractive power orthogonal thereto is represented in the form of a cylindrical lens corresponding to the difference from the refractive power of the spherical lens. Therefore, the measurement of an astigmatic lens by the use of the conventional lens meter has involved the procedure of initially knowing one of its refractive powers, recording such refractive power, moving the target T1 to determine the refractive power orthogonal thereto, and then determining the difference between the two refractive powers so that the prescription may indicate the refractive powers of the spherical lens and of a cylindrical lens. Moreover, the lens represented as the cylindrical lens must indicate both its refractive power and the angle of the principal meridians of the cylinder. The necessity to calculate the difference in the refractive powers tends to induce confusion with regard to the direction of the astigmatic axis. Also, movement and rotation of the target T1 relative to the reticle T2 must be effected as by keeping the reticle stationary and moving and rotating the target. The mechanism is complex in the sense that its operation requires great care. Furthermore, in mass production factories where a number of lenses identical in refractive power are to be inspected or checked, the target T1 may be placed at a preset position representing the refractive power to be measured and a multitude of lenses which seem to be of identical refractive power may be placed at a predetermined position if the lenses are spherical lenses. On the other hand, when astigmatic lenses are to be inspected, there is the limitation that they cannot be preset to a predetermined position.

SUMMARY OF THE INVENTION

An object of the present invention is to overcome the above-noted limitations and disadvantages, and to provide a simple and expedient lens meter which can measure the orthogonal refractive powers of astigmatic lenses while eliminating any possibility of confusion with regard to the astigmatic axis.

According to the present invention, a lens meter for measuring the focal length of a sample lens with the sample lens disposed in a collimated light beam comprises a target, a first lens for forming an image of the target, light beam splitter means in the light beam on the image forming side of the first lens for splitting the light beam to form a second target image, a second lens having its focal points on the first and second target images through the light beam splitter means, target orthogonalizing means between the first and second lenses for making the first and second target images orthogonal to each other, a third lens for focusing the orthogonal target images collimated by the second lens, and target viewing means disposed at the focal point of the third lens.

The target orthogonalizing means may comprise reflecting means and a prism, the prism being inclined at 45° with respect to one of the optical axes of the split light beams on the image forming side and disposed on the optical axis of the split light beam on the image forming side. The reflecting means or member and the prism are movable on and along the optical axes on which they are disposed.

The target orthogonalizing means may also comprise two prisms disposed on the optical axes of the split light beams on the image forming side so that the perpendicular to the bottom surface of one of the two prisms forms an angle of 45° with the segment provided by the bottom surface of the other prism.

The target is rotatable about its axis. The first lens has its focal point on the target. This lens may have a lens associated therewith for focusing the focal image of the target, the associated lens member being movable along the optical axis thereof. In this case, the target orthogonalizing means may comprise two prism members disposed on the optical axes of the split light beams on the image forming side so that the perpendicular to the bottom surface of one of the two prisms forms an angle of 45° with the segment provided by the bottom surface of the other prism.

The invention will hereinafter be described in greater detail with respect to several specific embodiments thereof shown in the accompanying drawings.

BRIEF DESCRIPTION OF THE DRAWINGS

FIG. 5 schematically shows a second embodiment of the invention; and

FIG. 6 schematically shows a third embodiment of the invention.

DESCRIPTION OF THE PREFERRED EMBODIMENTS

Figure 1:
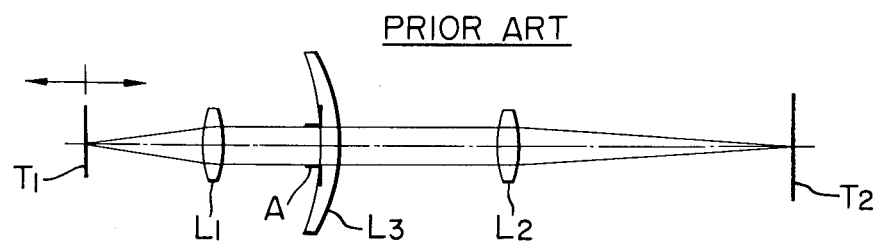
FIG. 1 illustrates the principle of the conventional lens meter.
Figure 2:
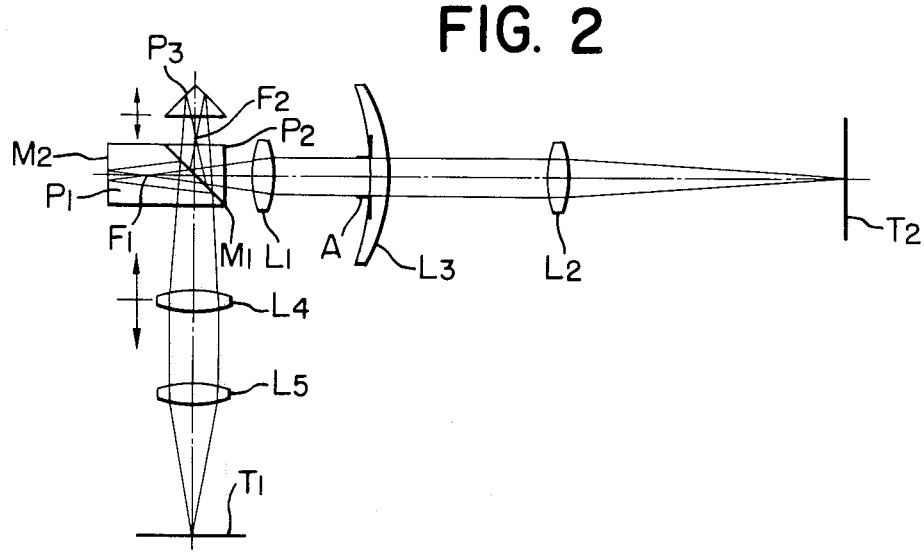
FIG. 2 schematically shows a first embodiment of the present invention.

Referring to FIG. 2, T1 designates a target placed on the focal point of a lens L5. An associated relay lens L4 is movable along the optical axis of the lens L5 for forming a spatial image of the target T1. Movement of the lens L4 along the optical axis is identical in effect to movement of the target T1. The amount of movement of the lens L4 and that of the primary image of the target T1 corresponds to a ratio of 1:1. P1, P2 and P3 are prisms for separating the primary image of the target T1 into two images, and a semi-transparent member M1 is disposed between the prisms P1 and P2. The semi-transparent member may comprise a semi-transparent film of any suitable material, such as foil of silver or aluminum or the like, and may be joined to the face of one of the two prisms. The semi-transparent member acts as a light beam splitter means. A portion M2 of the prism P1 is made to provide a reflecting surface. The prism P3 is movable coaxially with the lens L4, and it is disposed in 45°-inclined relationship with respect to the optical axis of the lenses L4 and L5 so that the primary image of the target T1 reflected by the reflecting surface M2 of the prism P1 and the primary image of the target T1 reflected by the prism P3 are orthogonal to each other (because the principal meridians of an astigmatic lens are always orthogonal to each other). The reflecting surface or means M2 and the prism P3 constitute target orthogonalizing means for the images, respectively, reflected by these members. The components L1, L2, L3, A and T2 are identical to those in the conventional optical system shown in FIG. 1.

Figure 3:
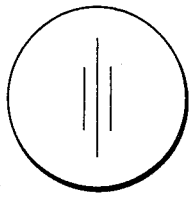
FIG. 3 is a view showing a form of the target T1.

FIG. 3 shows a form of the target T1.

In an optical system having such an arrangement, let the zero point of the spherical lens be the position assumed by the relay lens L4 when the primary image of the target T1 formed by the relay lens being moved to cause deflection from the prism P1 has come onto the primary focal point F1. Also, let the zero point of the cylindrical lens be the position of the prism P3 when the primary image of the target T1 formed by the prism P3 being then moved to cause reflection from the prism P3 has come onto the primary focal point F2 of the lens L1. The primary image of the target T1 then seen on the reticle T2 was the appearance shown in FIG. 4.

Since the amount of movement of the relay lens L4 from the zero point and that of the primary image of the target T1 are made to correspond to 1:1, the following relations are established when the target T1 and the reticle T2 become conjugate with each other:

$$Z' = f^2 \times D, \text{ and } Z'' = f^2 \times \frac{D}{2},$$

where $Z'$ is the amount of movement of the relay lens L4 from the zero point when the image of the target T1 has been formed on the reticle T2, $Z''$ is the amount of movement of the prism P3 from the zero point when the image of the target T1 by the reflection from the prism P3 has been formed on the reticle T2, $f$ is the focal length of the lens L1, and $D$ is the refractive power of the sample lens L3.

If the sample lens L3 is an astigmatic lens, then the lens L4 is first moved to measure the first of the refractive powers. This refractive power is representative of a spherical lens. Subsequently, the prism P3 is moved to measure the other refractive power, which is orthogonal to the first refractive power. The latter refractive power is the difference from the first refractive power or the power of the spherical lens, and hence, the refractive power which represents the cylindrical lens. Therefore, this lens meter can obtain a value as stated in the usual prescription. Also, if the principal meridian scales of the target T1 and that of the cylindrical lens are made to correspond to each other, there is no confusion concerning the direction of the astigmatic axis. Further, when a number of astigmatic lenses identical in refractive power are to be inspected, the inspection may be accomplished by simply setting the two refractive powers of each astigmatic lens with the aid of the lens L4 and prism P3.

In the embodiment of the invention shown in FIG. 5, like reference characters refer to like elements described with reference to FIG. 2. Describing those parts which differ from the parts shown in FIG. 2, a mirror and a semi-transparent mirror operationally replace the prisms P1 and P2, respectively. M1 is the semi-transparent mirror, and M2 is the mirror movable along the optical axis of the lenses L1 and L2. In this embodiment of the invention, the lens L4 is stationary.

In this form of optical system, the following relationship is established between the distance Z1 from the position of the mirror M2 when the primary image of the target T1 formed by the mirror M2 lies on the primary focal point F1 of the lens L1 to the position of the mirror M2 when the image of the target T1 is formed on the reticle T2 by the reflection from the mirror M2, with reference to the refractive power D1 of the sample lens L3, and the focal length $f$ of the lens L1:

$$Z1 = f^2 \times \frac{D1}{2}.$$

The following relationship also is established between the distance Z2 from the position of the prism P3 when the primary image of the target T1 formed by the reflection from the prism P3 lies on the primary focal point F2 of the lens L1 to the position of the prism P3 when the image of the target T1 is formed on the reticle T2 by the reflection from the prism P3, with reference to the refractive power D2 of the sample lens L3 which is orthogonal to the refractive power D1 and the focal length $f$ of the lens L1:

$$Z2 = f^2 \times \frac{D2}{2}.$$

Thus, for the measurement of the refractive powers of an astigmatic lens, the mirror M2 is first moved to measure one refractive power D1 of the astigmatic lens, and then the prism P3 is moved along the optical axis of the lenses L4 and L5 to measure the other refractive power D2 which is orthogonal to the refractive power D1. In this manner, the refractive powers of an astigmatic lens may be simply indicated with D1 as the refractive power of the spherical lens and (D1–D2) as the refractive power of the cylindrical lens.

In this embodiment too, the two refractive powers orthogonal to each other may be measured simultaneously within the same field of view, and the possibility of confusing the astigmatic axis is eliminated. Also, when a number of astigmatic lenses identical in refractive power are to be inspected, the inspection may be accomplished by setting the two orthogonal refractive powers with the aid of the mirror M2 and the prism P3.

Figure 4:
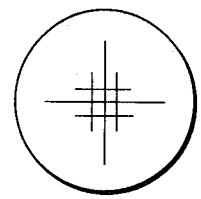
FIG. 4 shows a primary image of the target formed on a reticle.

In measuring the refractive powers of an astigmatic lens, unknown two principal meridians of the astigmatic lens must be aligned with the directionality of the target T1 as shown in FIG. 3. If there is no such alignment, suitable focusing will not occur, and accurate measurement of the refractive powers cannot be accomplished. As previously described, this has heretofore been overcome by rotating the target T1 to align the image of the target with one of the two principal meridians. In the optical systems of the first and second embodiments as hereinbefore described, simple rotation of the target T1 about the optical axis does not result in the formation of the mutually orthogonal images of the target on the reticle T2 as shown in FIG. 4, since the rotation of the target in the prism P3 does not correspond to a 1:1 ratio in either of those embodiments. Thus, only one of the two principal meridians of the sample lens L3 may be measured for astigmatism, and the other principal meridian must be measured by again rotating the target T1, which apparently means a dual procedure.

In the embodiment shown in FIG. 6, the target images constantly maintained in mutually orthogonal relationship as shown in FIG. 4 may be provided on the reticle T2 irrespective of rotation of the target T1. This optical system is almost the same in construction as the system shown in FIG. 3, with the exception that a prism P4 replaces the mirror M2 and that prisms P3 and P4 are inclined at 45° with respect to each other. This ensures that the images of the target T1 will be orthogonal to each other, and the target may be moved at a speed twice the angular rotation of the target, that is, all the astigmatic axes (0°–180°) may be covered by rotating the target through 90°. Prisms P1 and P2 are not essential, but the use of these prisms is preferred in that the dual image resulting from the mirror M1 may be avoided. In this embodiment of the invention, the lens L4 is movable. Alternatively, the prism P4 may be movable.

Although the present invention has been described with particular reference to several preferred embodiments, it is to be understood that changes and modifications may be made therein without departing from the spirit and scope of the invention as set forth in the appended claims.

I claim:

1. A lens meter for measuring the focal length of a sample lens with the sample lens disposed in a collimated light beam, comprising:
   a target;
   a first lens for forming an image of the target;
   light beam splitter means in the light beam on the image forming side of the first lens for splitting the light beam to form a first and a second target image;
   a second lens having its focal points on the first and second target images through the light beam splitter means;
   target orthogonalizing means provided between the first and second lenses for making the first and second target images orthogonal to each other;
   a third lens for focusing the orthogonal target images collimated by said second lens; and
   target viewing means at the focal point of the third lens.

2. A lens meter according to claim 1, wherein the target orthogonalizing means comprises reflecting means and a prism, the prism being inclined 45° with respect to one of the optical axes of the split light beams on the image forming side and disposed on the optical axis of the split light beams on the image forming side.

3. A lens meter according to claim 2, wherein the reflecting means and the prism are movable along the optical axes on which they are disposed.

4. A lens meter according to claim 1, wherein the target orthogonalizing means comprises two prisms on the optical axes of the split light beams on the image forming side so that the perpendicular to the bottom surface of one of the two prisms forms an angle of 45° with the segment provided by the bottom surface of the other prism.

5. A lens meter according to claim 1, wherein the target is rotatable about its axis, the first lens having its focal point on said target, a lens associated with the first lens for focusing the focal image of the target formed by the first lens member, said associated lens being movable along the optical axis thereof; and wherein the target orthogonalizing means comprises two prism members disposed on the optical axes of the split light beams on the image forming side so that the perpendicular to the bottom surface of one of said two prisms forms and angle of 45° with the segment provided by the bottom surface of the other prism.

* * * * *